United States Patent [19]

Paulraj et al.

[11] Patent Number: 5,345,599
[45] Date of Patent: Sep. 6, 1994

[54] INCREASING CAPACITY IN WIRELESS BROADCAST SYSTEMS USING DISTRIBUTED TRANSMISSION/DIRECTIONAL RECEPTION (DTDR)

[75] Inventors: Arogyaswami J. Paulraj, Palo Alto; Thomas Kailath, Stanford, both of Calif.

[73] Assignee: The Board of Trustees of the Leland Stanford Junior University, Stanford, Calif.

[21] Appl. No.: 839,624

[22] Filed: Feb. 21, 1992

[51] Int. Cl.$^5$ .............................................. H04B 7/06
[52] U.S. Cl. .................................... 455/49.1; 455/101; 455/105; 455/27 B; 342/367; 348/384
[58] Field of Search .................. 455/49.1, 51.1, 51.2, 455/59, 60, 61, 101, 103, 105, 137, 273, 278.1; 375/38, 40; 342/367, 463–465; 358/133, 138, 141, 146; 370/59, 63, 64

[56] References Cited

U.S. PATENT DOCUMENTS

| | | | |
|---|---|---|---|
| 4,750,147 | 6/1988 | Roy, III et al. | 364/807 |
| 4,888,641 | 12/1989 | Isnardi et al. | 358/141 |
| 4,935,813 | 6/1990 | Fonsalas et al. | 358/138 |
| 4,965,732 | 10/1990 | Roy, III et al. | 364/460 |
| 5,021,882 | 6/1991 | Schreiber | 358/141 |
| 5,040,211 | 8/1991 | Schreiber | 380/14 |
| 5,041,909 | 8/1991 | Okano | 358/146 |
| 5,095,535 | 3/1992 | Fresburg | 455/278.1 |

FOREIGN PATENT DOCUMENTS 0164749 12/1985 European Pat. Off. .............. 375/38

*Primary Examiner*—Reinhard J. Eisenzopf
*Assistant Examiner*—Chi Pham
*Attorney, Agent, or Firm*—Townsend and Townsend Khourie and Crew

[57] ABSTRACT

A method and apparatus for increasing the capacity of wireless broadcast communications system from a central studio to a plurality of users in a service area is disclosed. Given a source signal whose high information rate exceeds the practical information carrying capacity of the available broadcast channel bandwidth, the invention increases the effective capacity of the broadcast system to effectively communicate such a source signal. The high-rate signal is split into several low-rate signals such that each can be accommodated within the allocated bandwidth. These low-rate signals are transmitted from spatially separated transmitters, all radiating into the service area in the same frequency channel. Each receiver uses a plurality of antennas to receive these multiple cochannel signals that arrive from different directions-of-arrival. The receiver exploits the directions-of-arrival differences of these cochannel signals to separate them into the individually transmitted signals. The separated signals are then demodulated to extract the information signals which are then combined to obtain the original high-rate source signal. Thus, the broadcast information capacity can be increased several-fold.

4 Claims, 7 Drawing Sheets

INCREASING CAPACITY IN WIRELESS BROADCAST SYSTEMS USING DISTRIBUTED TRANSMISSION/DIRECTIONAL RECEPTION (DTDR)

BACKGROUND

1. Field of the Invention

This invention relates to the field of wireless broadcast of information to a multiplicity of receivers, and in particular to a method and apparatus for increasing the effective information transmission bandwidth or equivalently channel capacity by means of source signal splitting, spatially distributed cochannel transmission, directionally selective reception, and source signal recombination.

1. Prior Art

In wireless broadcast systems, information generated by a source is transmitted by wireless means to a plurality of receivers within a particular service area. The transmission of such information over a fixed time interval requires a finite amount of (frequency) bandwidth, and in current state-of-the-art, transmission of information from different sources must occur in different frequency bands (channels). Since there are quite a few services (e.g., television (TV), FM radio, private and public mobile communications, etc.) competing for a finite amount of available spectrum, the amount of spectrum which can be allocated to each channel is severely limited. Innovative means for using the available spectrum more efficiently are of great value. In current state-of-the-art systems such as broadcast television, a suitably modulated signal is transmitted from a single tower centrally located in the service area and propagate to receiving stations in the service area surrounding the transmitter. The information transmission rate achievable by such broadcast transmission is constrained by the allocated bandwidth (C. P. Sandbank, "Digital Television", John Wiley, 1990 and W. F. Schreiber, "Fundamentals of Electronic Imaging: Some Aspects of Image Processing", Springer Verlag, 1991).

Due to attenuation suffered by signals in wireless propagation, the same frequency channel can be reused in a different geographical service area. Allowable interference levels determine the maximum transmit power at each location, as a well as the minimum separation between service areas using the same channels. Currently, within a service area, the rate at which information can be transferred to the receivers is limited by the fact that use of any channel is on a one-at-a-time basis. Simultaneous transmission of independent signals requires the use of separate channels. The current invention is a new method for increasing the capacity of a broadcast channel several fold by employing directional channels. Directional channels are realized by spatially distributing signals to be transmitted, and employing directionally sensitive receivers, a concept unique to this invention.

In prior art, increasing the capacity of point-to-point communication links has been proposed by S. Anderson, et al. "An Adaptive Array for Mobile Communications Systems", IEEE Trans. Veh. Technology, Vol.40. February 1991, pp. 230–236, and S. C. Swales, et al. "The Realization of a Multi-beam Antenna for Cellular Mobile Land Radio System", Mobile Radio and Personal Communications Conf., U.K., December, 1989, pp. 341–348. These papers addressed means for increasing the number of simultaneous users of a wireless communication system by allowing more than one user to use the same frequency, and exploiting the differences in directions-of-arrival at the receive antenna array to separate the different signals. However, they do not address the problem of increasing capacity in a broadcast channel.

Also in prior art, increasing capacity of point-to-point communication links using directional channels was claimed in R. Roy, et al., "Methods for Estimating Signal Source Locations and Signal Parameters Using an Array of Signal Sensor Pairs," U.S. Pat. No. 4,750,147, March 1985, U.S. Cl. 364–800, and R. Roy, et al., "Methods and Arrangements for Signal Reception and Parameter Estimation," U.S. Pat. No. 4,968,732, July 1987, U.S. Cl. 364–460, and in a recent patent filing, R. Roy, et al., "Spatial Division Multiple Access Wireless Communication Systems", U.S. patent application Ser. No. 806,695, filed Dec. 12, 1991. Therein, no reference is made to the broadcast problem, and increasing broadcast channel capacity is not claimed in these patents. Moreover, in the first two referenced patents, arrays used therein are required to possess a special structure, i.e., sensors occur in pairs of identical elements.

Spatial processing has also been used in the context of spatial diversity techniques wherein multiple antennas that are employed for reception of broadcast signals are scanned for the strongest signal and its output chosen for further processing, or some method for combining the such outputs is applied. Though this leads to a improvement in the quality of the received signal, there is no increase in system capacity.

In prior art, increasing capacity of TV broadcast systems and in particular for HDTV where a severe bandwidth constraint exists, several patents have proposed use of plural/multiple channels to increase information transmission: M. A. Isnardi, et al., "Extended Definition Widescreen Television System Using Plural Signal Transmission" U.S. Pat. No. 4,888,641, October 1988, US Cl. 358-141; T. Okano, "Multichannel Video Signal Transmission/Reproduction System" Japan Patent 5,041,909, December 1987, US Cl. 358-146; E. L. J. Fonsalves, "System of Transmitting High-Definition Television Pictures via a Relatively Narrow Passband Channel, and Also a Transmitter and Receiver Suitable for the System", U.S. Pat. No. 4,935,813, March 1988, U.S. CL. 358–138, W. F. Schreiber. "Definition Television Systems" U.S. Pat. No. 5,021,882, April. 1989, US Cl. 358–141. In W. F. Schreiber, "Reliable Television Transmission Through Analog Channels", U.S. Pat. No. 5,040,211 October 1988, US Cl. 380–14, a system for spatially processing the acquired TV image, dividing it into spatiotemporal frequency components, followed by coding of the information prior to transmission is disclosed. However, none of this prior art mentions the use of spatial processing or directional channels to increase capacity. The word channel in all the above cases refers to frequency channels, and multiple channels require additional spectrum. Reuse of the same frequency channel by transmitters at different spatial locations is unique to this invention.

LIMITATIONS OF PRIOR ART

The fundamental limitation of prior art is that it is constrained by the limited bandwidth of each channel and the number of available channels. The limited bandwidth constrains the rate at which information can be transferred to the users in each channel, and the number of available channels is the number of simulcast transmissions possible. Current attempts to overcome the limited bandwidth problem primarily include data compression and efficient modulation. M. A. Isnardi et al., "A Single Channel NTSC Compatible Widescreen EDTV System" Image Technology, April 1988, pp. 118-119. Fukinuki et al., "Extended Definition TV Fully Comaptible with Existing Standards" IEEE Trans. COM-32, No.8, August 1984, pp.948-953. These methods try to alleviate the limited bandwidth problem by making the most effective use of the available bandwidth of the broadcast channel. However, due to enormous demands for increased definition (fidelity) in broadcast video, music, etc., these compression and modulation techniques offer at best a temporary respite for the problem. A fundamentally new means of increasing effective transmission bandwidth is needed. (R. Hopkins, "Advanced Television Systems", IEEE Trans. Consumer Electronics, February 1988, pp. 1-15).

Current proposals for improved broadcast services either use a combination of the above techniques or involve new spectrum allocation. For example, the proposed expansion of HF broadcast services involves changing from the current double sideband modulation standard to a more spectrally efficient single sideband modulation standard. In addition, a fresh allocation of spectrum (in the 5 to 26 Mhz band) is also planned.

Another example of a severely constrained broadcast system is the proposed terrestrial digital HDTV standard. Therein, a combination of data compression, efficient channel modulation and the allocation of limited additional spectrum (taboo channels) are all planned. Despite this, because of the very high data rate of high definition full-motion video, such a system may demand excessive transmission power thereby increasing the attendant simulcast and co-channel interference problems in an attempt to keep the costs of digital HDTV receivers at reasonable (marketable) levels.

Therefore, in view of the basic principle that broadcasting of information requires bandwidth, the fundamental limitation of the amount of usable spectrum available has become a serious barrier to expanding the quality and capacity of wireless broadcast systems. As demonstrated over the last decade, the amount of practically usable frequency spectrum cannot keep pace with the demand for new broadcast services. Thus there is a critical need for new technology to increase spectrum utilization. The current invention directly addresses this need.

OBJECTS AND ADVANTAGES

The present invention is directed to a method and apparatus for increasing information transmission capacity or equivalently effective transmission bandwidth of wireless broadcast communication systems. The invention essentially consists of splitting a potentially high information rate source signal, whose frequency content may exceed the allocated channel bandwidth, into several low-rate signal components, and transmitting the low-rate components, each of which occupy some or all of the allocated bandwidth, in the same frequency channel from spatially separated transmitters. The transmitters radiate into the broadcast area on the same frequency (channel), and a plurality of antennas are used to receive the transmitted signals. Separation of the signals arriving in the same frequency channel, but from different directions, is performed. The different transmitted signals are thus extracted, then combined to reconstruct the original high rate source signal. Thus, the broadcast information capacity is increased several fold without increasing the frequency bandwidth allocation. Unique to this invention is the transmission of different information signals in the same frequency band from spatially separated transmitters such that these cochannel signals arrive from distinct angles of arrival at the receiver. There, a multiplicity of antennas and appropriate spatial processing is used to separate the signals. The advantage of the Distributed-Transmit Directional-Receive (DTDR) system is that information can be transmitted to receivers at a higher rate in a prescribed frequency bandwidth than is possible in current state-of-the-art.

One major application of the current invention is in the burgeoning field of high-definition television (HDTV). Though the invention is not restricted to this application, it forms an appropriate basis for a description of the methods and apparatus of DTDR invention. In current state-of-the-art television broadcast systems, a finite amount of bandwidth has been allocated to the transmission of video information in each of many frequency channels. In the United States, the Federal Communications Commission (FCC) has licensed the use of radio frequency (RF) spectrum in 6 MHz channels for the purpose of video transmission, an amount adequate for past and present television technology. However, recent advances in semiconductor and video display technology have made increased resolution economically viable. Unfortunately, increasing the resolution over the current state-of-the-art requires transmission of more information.

The objective in HDTV is to increase the horizontal and vertical resolution of full-motion video and this leads to substantial increase in information rate in the the absence of information compression. To expand the transmission bandwidths of the current transmission systems would be incompatible with the broad installed base of current television systems. Therefore, introduction and acceptance of HDTV into the U.S. marketplace hinges on the ability to at least restrict the transmission bandwidth to be compatible witch the current state-of-the-art, i.e., 6 MHz. Since the current analog video transmission system occupies nearly all of the available bandwidth, increasing the bandwidth beyond that obtained by using the taboo channel is not acceptable; thus information compression is seen as a necessity. Since information compression is an exceedingly difficult task to perform on analog signals, most proponents of HDTV agree that the video source signal must first be digitized before attempting to remove redundant information (i.e., compressing it). This further exacerbates the bandwidth problem since analog signals are inherently more bandwidth efficient than their digital (unencoded) counterparts. Coupled with the fact that for full-motion video at twice the current resolution to be acceptable the current screen refresh rate (30 MHz in the U.S.) must also be doubled, there is something of a data rate explosion prior to transmission. This explosion places severe requirements on the amount of lossless compression required to meet the bandwidth specifications (A. Netravali et al., "A High Quality Digital HDTV Codec", Proc. of 25$^{th}$ Asilomar Conf. on Circuits, Sys. and Comp., November 1991, pp. 451-455). This will not only make such compression (and decompression in the receivers) extremely expensive, lossless compression is also very difficult to achieve and a full quality HDTV will be near impossible to develop. The availability of additional bandwidth will can greatly improve the cost and quality of HDTV system. The aim of the present invention is to provide such increased transmission bandwidth within the available channel bandwidth allocation.

Though the advantages above have been described in the context of wireless HDTV broadcast, there are a number of other broadcast applications such as digital audio broadcast (DAB) services that can profit by this invention. Also the increased capacity made possible by this invention can be used for increasing the number of program channels in addition to increasing the definition (quality) of the broadcast channels. Further increased bandwidth can be traded for reduced transmitted power, improved signal quality, etc., as is well known in the state-of-the-art. Further objects and advantages will become apparent from a consideration of the drawings and ensuing description of it.

Figure 1:
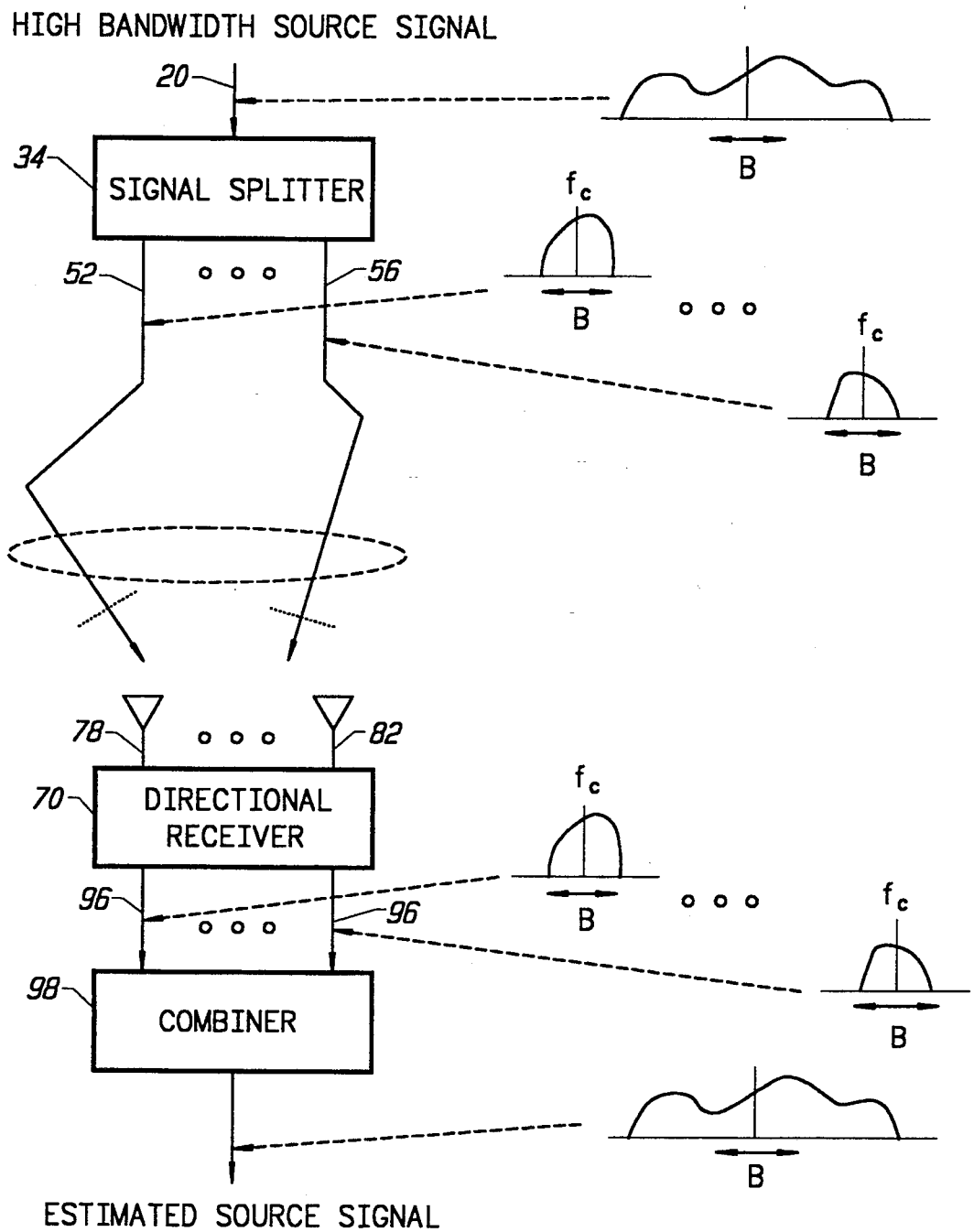
FIG. 1 is a diagram of the DTDR invention indicating the increased information transmission capacity obtained using distributed transmission and directional reception, a concept unique to this invention.

REFERENCE NUMERALS IN DRAWINGS 18. source equipment
20. source stream (signal)
22. transmission equipment at station 1
24. transmission equipment at station 2
26. transmission equipment at station d
34. signal splitter
36. transmit antenna 1
38. transmit antenna 2
40. transmit antenna d
50. broadcast studio
52. signal substream from splitter to transmitting station 1
54. signal substream from splitter to transmitting station 2
56. signal substream from splitter to transmitting station d
58. service area
60. representative receiving station
62. transmitting station 1
64. transmitting station 2
66. transmitting station d
70. DTDR receive system
72. receive antenna 1
74. receive antenna 2
76. receive antenna m
78. antenna 1 output
80. antenna 2 output
82. antenna m output 84. m channel receiver front-end
86. m receiver front-end outputs to spatial filters
88. d channel spatial filters
90. d spatial filter outputs to channel demodulators/decoders
92. d channel demodulators/decoders
96. d demodulator/decoder outputs to combiner
98. combiner
100. estimated source stream (signal)
102. terminal equipment
110. tapped delay line connecting input 1 with summer 1
112. tapped delay line connecting input 1 with summer d
114. tapped delay line connecting input m with summer 1
116. tapped delay line connecting input m with summer d
120. connection from tapped delay line 1 input 1 to summer 1
122. connection from tapped delay line 1 input m to summer 1
124. connection from tapped delay line d input 1 to summer d
126. connection from tapped delay line d input m to summer d
140. summer 1
142. summer d
146. weight adjustment circuit
148. Signal sources
150. Signal combiner
152. Signal separator

DETAILED DESCRIPTION

In this discussion, the following definitions are employed. The term source equipment (18) includes all manner of information generating devices including but not limited to still or motion video camera (including HDTV cameras), audio microphones and amplifiers, computers with necessary hardware and software to generate graphics, sound, data, video/audio/data storage devices, etc.. The term carrier-to-interference ratio (C/I) refers to the ratio of the power of the desired signal from a given transmitting station to the total power of the undesired interfering signals from the other transmitting stations. The term source data stream (20) refers to any digital or analog signal generated by source equipment and which is to be transmitted to a plurality of receivers in the service area.

DTDR—Description

In the interest of clarity of exposition, it is assumed that the source stream (signal) is available in a digital format from the source equipment and likewise is delivered to terminal equipment in a digital format. Other signal formats can also be used. Digital modulation of the wireless transmission is also assumed for the purposes of discussion. Again, analog modulation can also be employed.

FIG. 1 is a diagram indicating the signal flow in one embodiment of the DTDR invention. A high bandwidth source signal (20) with a frequency bandwidth in excess of the channel bandwidth (B) is decomposed by a signal splitter (34) into d signal components (52,56), each with frequency bandwidth less than or equal to B and broadcast into a service area on the same frequency channel of bandwidth B, where it is received by a plurality of users. An m-element antenna array receives d signals and a directional receiver (70) separates these signals that arrive at different angles-of-arrival and recovers the d signal components (96) which are then assembled in a combiner (98) to reconstruct the estimated source signal (100). This diagram illustrates that increased information transmission capacity is obtained using distributed transmission and directional reception.

Figure 2:
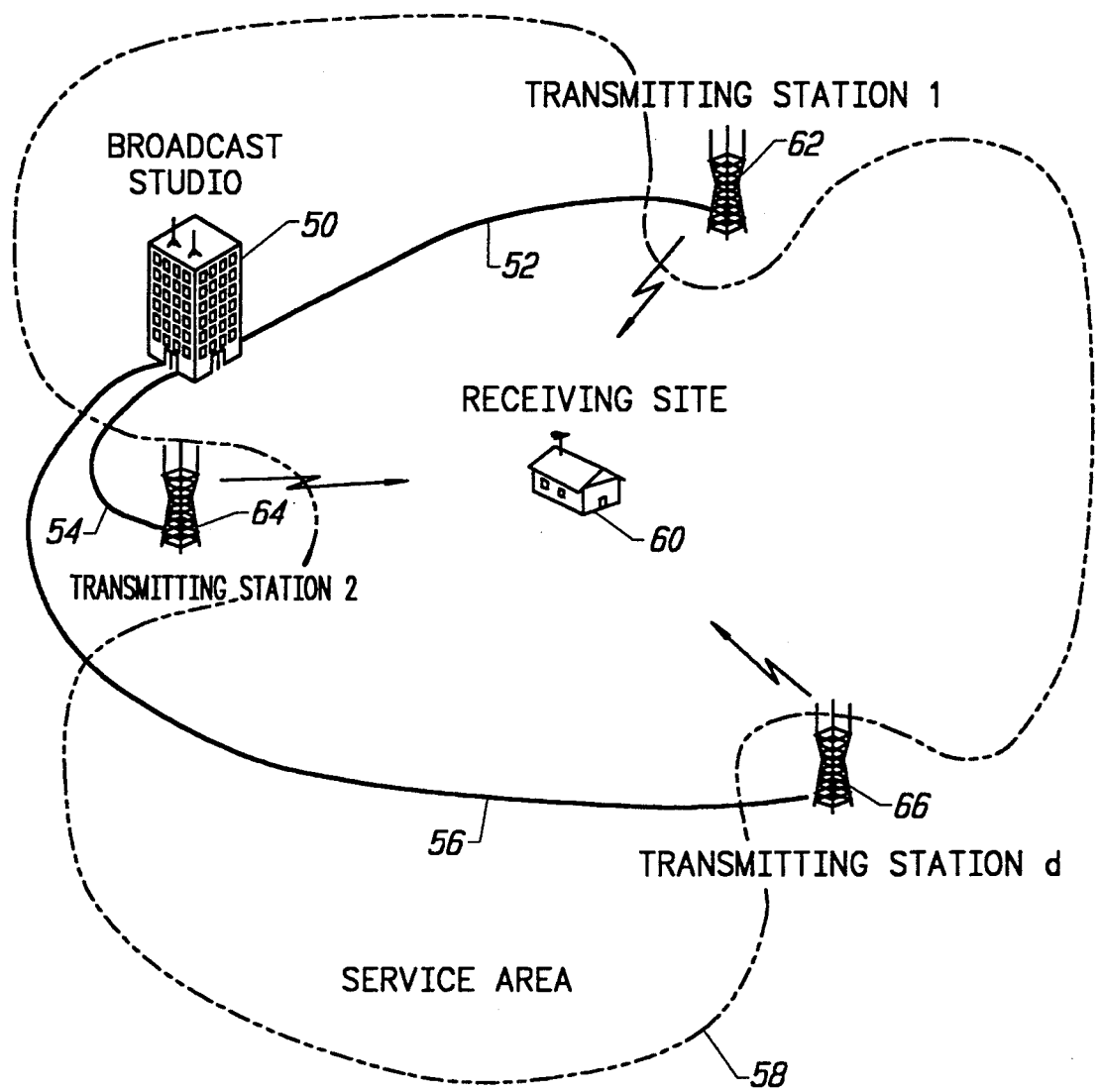
FIG. 2 is an illustration a central broadcast studio that outputs multiple low rate signals that are communicated to spatially separated transmitters for radiation into the service area in the same frequency channel.

FIG. 2 shows the overall scenario of the central broadcasting studio (50), d transmitting stations (62, 64, 66) and a representative receiving station (60). The system can effectively broadcast a high data rate signal using a low capacity channel by reusing this frequency channel through exploitation of the differences in directions between a receiving station and the transmitting stations. The service area (58) is that geographical area served by the broadcast system. The d low rate data streams generated in the broadcast studio are sent to the transmitting stations using state-of-the-art point-to-point communication techniques.

Figure 3:
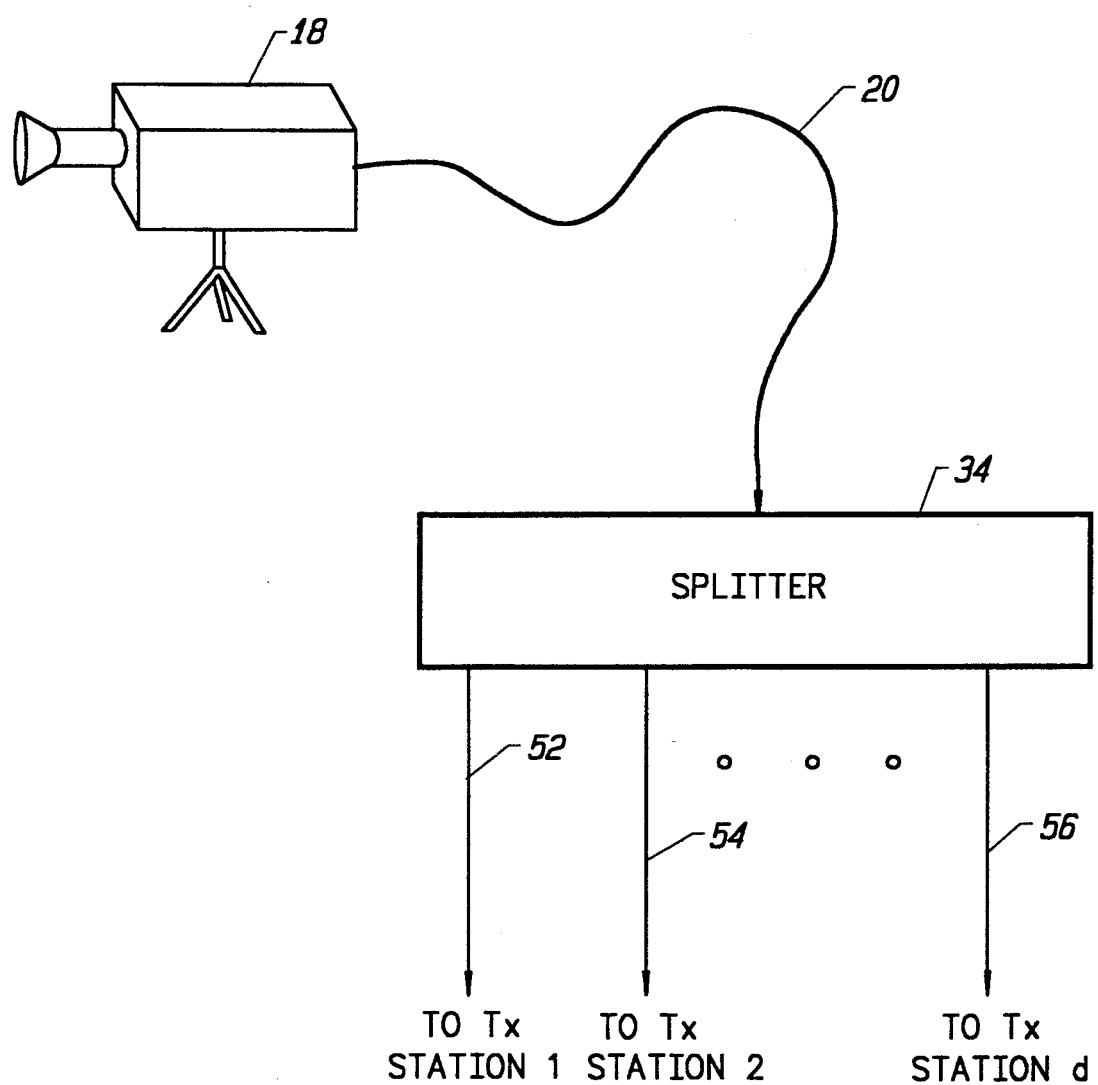
FIG. 3 is an illustration of the high rate source signal being split into multiple low rate signals which are sent to the transmitting stations.

FIG. 3 shows the generation of the high rate source stream (20) by the source equipment (18) and its decomposition (splitting) into multiple low rate substreams. In one embodiment, the signal splitter is a simple d-way demultiplexer. In other embodiments, coding techniques established in current state-of-the-art can be used to improve robustness to channel errors. The d signal substreams (52, 54, 56) output by the signal splitter are then communicated to the d remote transmitting stations.

Figure 4:
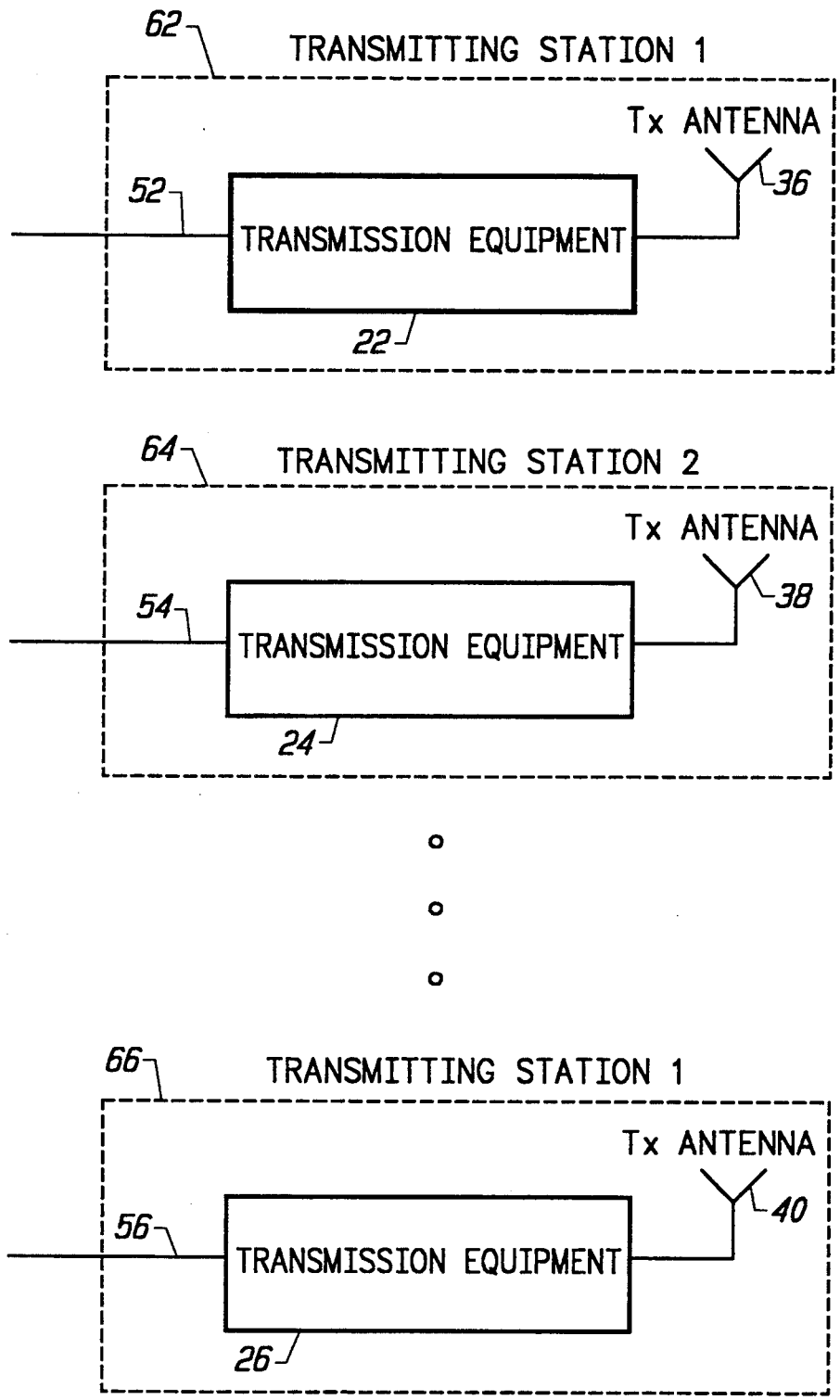
FIG. 4 is an illustration of the operation of the transmitting stations.

FIG. 4 shows spatially separated transmitting stations (62, 64, 66) where the substreams received from the studio are processed by the transmission equipment (22, 24, 26), then coupled to the transmit antennas (36, 38, 40) for transmission into the service area. The functions of the transmission equipment include channel coding, modulation and front-end processing and these methods are well established in the state-of-the-art. All transmitters radiate their different substreams in the same frequency channel. If several program channels are to be broadcast simultaneously, each program channel will use a different frequency channel as is done in current state-of-the-art.

Figure 5:
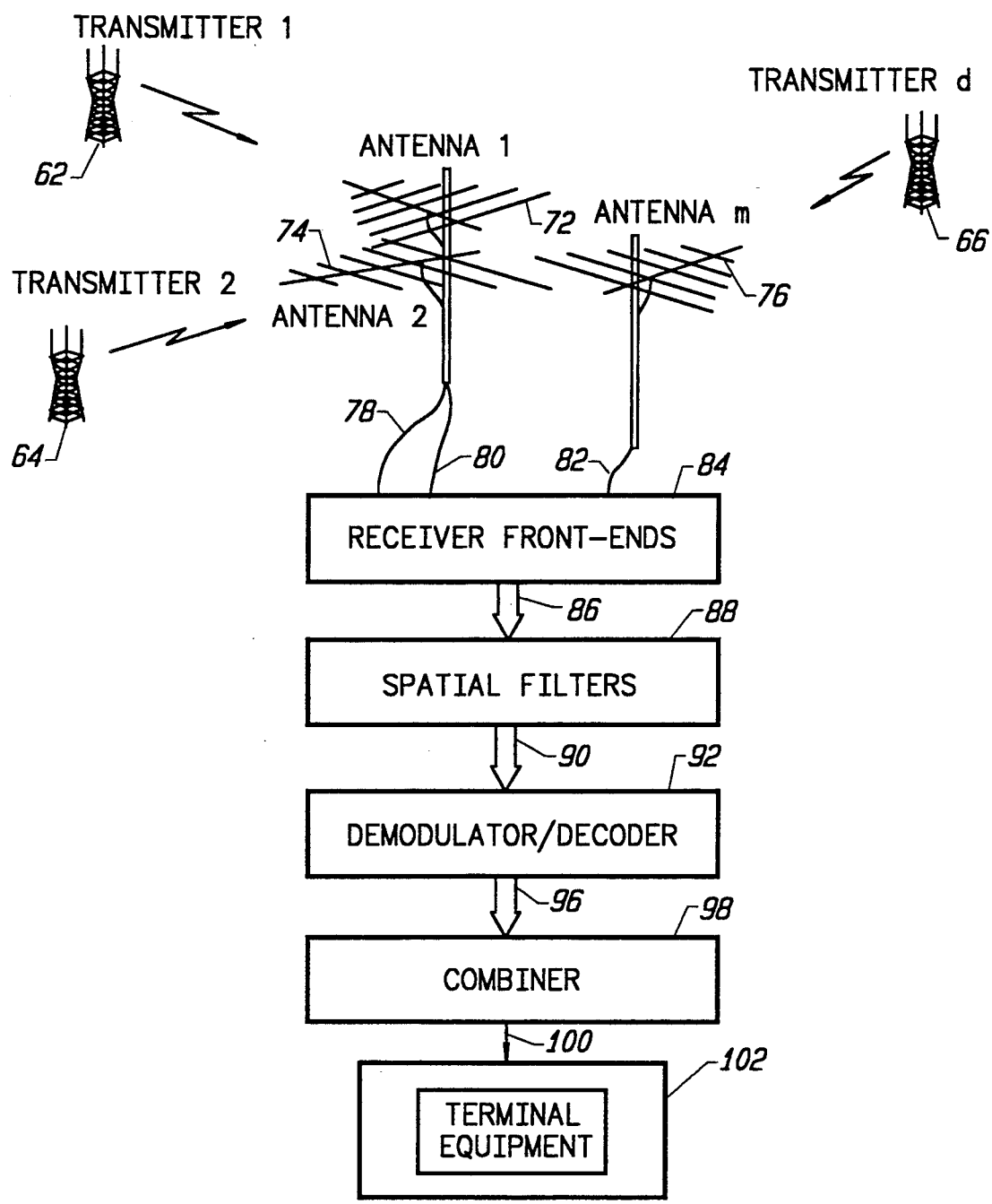
FIG. 5 is an illustration of the functionality of the receiving station wherein impinging signals are separated by exploiting the distinct directions-of-arrival.

FIG. 5 shows operation of a representative receiving station. A receiving station located within the service area will receive all d signals in the same frequency channel. Receiving stations use a receive antenna array that contains m subarrays (or elements) (72, 74, 76). The number of subarrays m must be equal to or greater than d, the number of transmitters. In one embodiment, the antenna array consists of m V/UHF Yagi antennas as the individual subarrays is located on the roof of a dwelling with suitable separation and arranged so that each subarray points to a different transmitting station.

The outputs of the m subarrays/antennas (78, 80, 82) are sent to a set of m receiver front-ends (84). The term receiver front-end refers to the unit which contains the amplifier, filter, and frequency downconverter, etc. These receiver front-ends are well established in the current state-of-the-art.

The m receiver front-end outputs (86) are input to the spatial filter (88) which uses these m signals to estimate the d separate impinging signals. The spatial filter consists of d processing channels (one for each transmitted signal) where each of these selectively pass one desired signal while rejecting other interfering signals, The d spatial filter outputs signals (90) are now processed by the d-channel demodulator and decoder (92) that first demodulates the signals to obtain the digital data streams which are then decoded to generate the d substreams that correspond to those output by the signal splitter at the broadcasting studio. These methods are well established in the state-of-the-art.

The demodulator outputs (96) are fed to the combiner (98) where these d streams are merged. In one embodiment, the combiner is simply a d-way multiplexer. In another embodiment where coding is employed in the signal splitter, the combiner must perform the appropriate decoding. These methods are well established in the current state-of-the-art.

The combiner output (100) is then sent to the terminal equipment (102) which includes all manner of information signal sinking devices such as TV receivers (including HDTV), audio receivers, computers, and other such equipment which can exploit the received source data stream.

Figure 6:
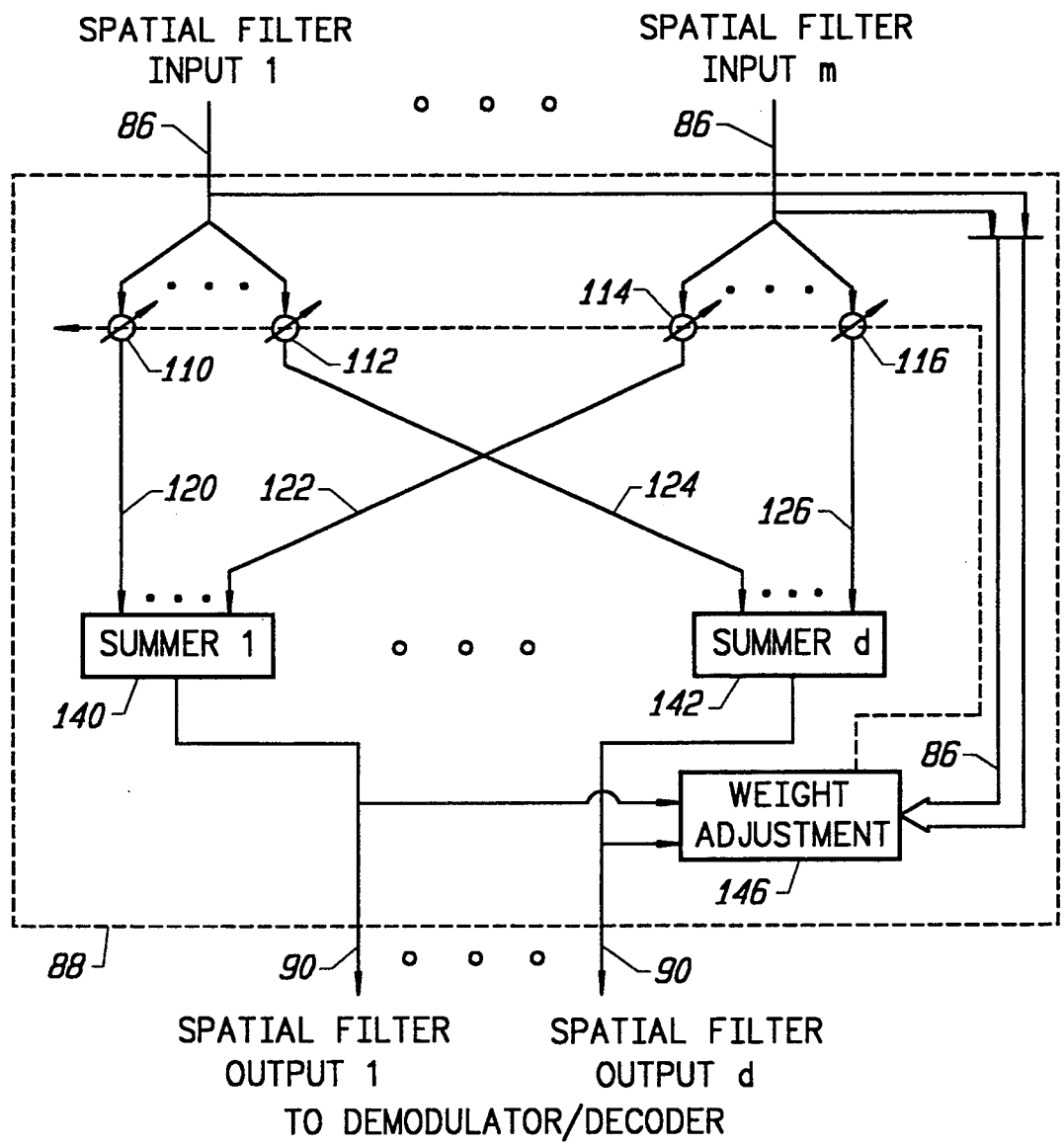
FIG. 6 is a diagram of the spatial filter that takes as inputs the m receive antenna signals and processes these to estimate the d distinct transmitted source signal components.

FIG. 6 is a diagram of one embodiment of the spatial filter (88). Therein, the m signals (86) received from the receiver front-ends are separated into the d distinct transmitted components. In this embodiment, there are d spatial filter channels each accepting the same m inputs and operating on these with d single or multitap tapped delay line filters (110,112,114,116) with adjustable weights and whose outputs arc then added in summers (140,142). to yield the d desired outputs. The weight adjustment circuit (146) uses apriori information, input and output signals of the spatial filter to determine the optimum weights. The d outputs of the spatial filter are sent to the demodulator/decoder for further processing. Techniques for spatial filtering that selectively receive a signal arriving at an antenna array from a specified direction while rejecting interfering signals arriving from other directions are well known in the current state-of-the-art and include optimum beamforming, interference rejection, adaptive hulling, etc.. See several texts including R. T. Compton, "Adaptive Arrays: Concepts and Performance", Prentice Hall, 1988; R. A. Monzingo and T. W. Miller, "Introduction to Adaptive Arrays", John Wiley, 1980; for techniques to construct such spatial filters for various signal and antenna types.

Figure 7:
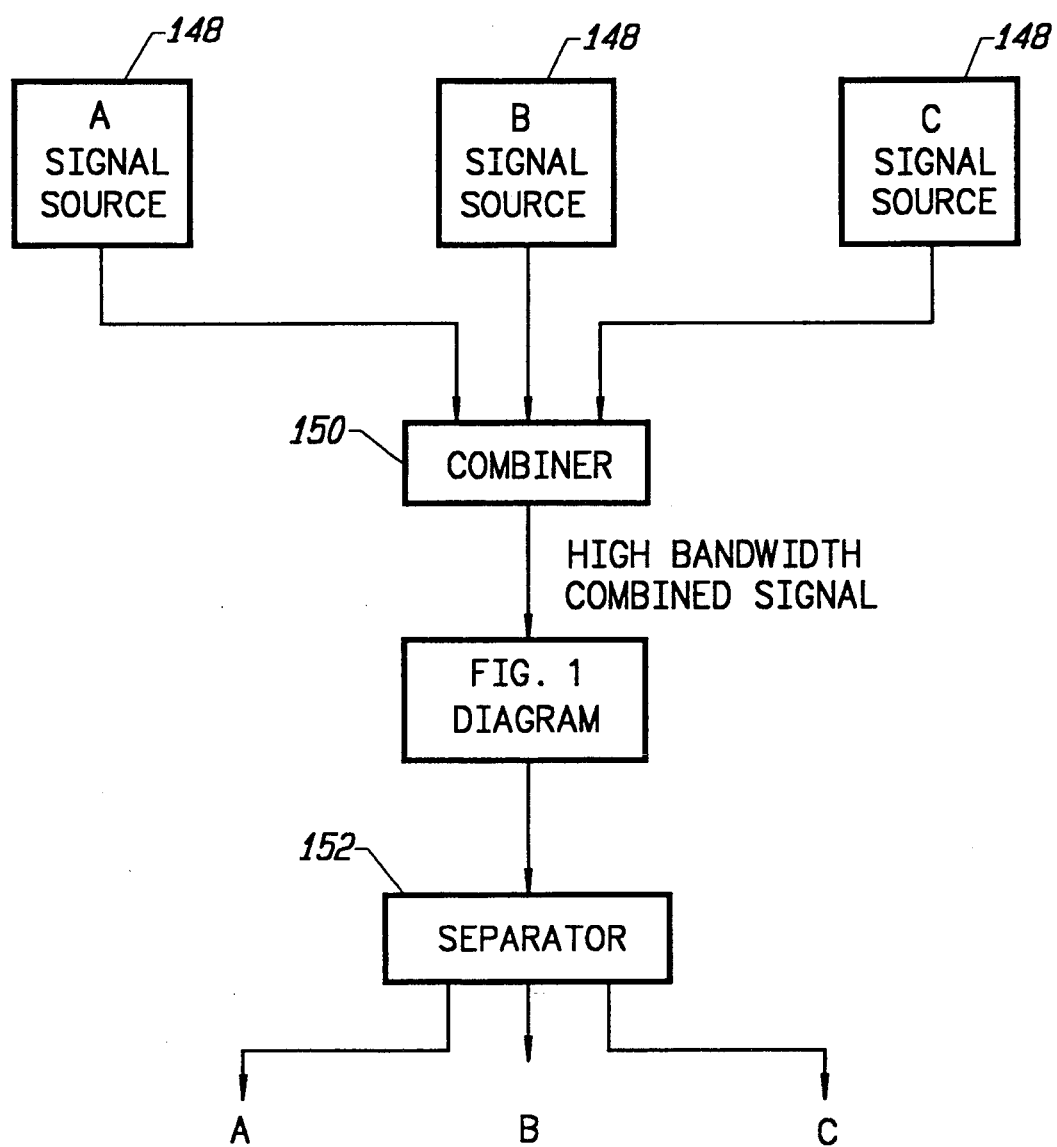
FIG. 7 is a diagram of a system for transmitting multiple signals as a composite signal in accordance with the invention.

FIG. 7 is a diagram of another embodiment of the invention in which signals A, B, C from independent sources 148 are combined at 150 and then transmitting using the flow diagram of FIG. 1. The combined received signals are then separated into the signals A, B, and C. As noted above, this embodiment of the invention increases the definition (quality) of the broadcast channels. In this embodiment, increased bandwidth is traded for reduced transmitting power and improved signal quality for each of the signals A, B, and C.

OPERATION OF THE INVENTION

Definitions

In this discussion, the following definitions are employed. The term steering vector refers to the vector of receiver outputs (appropriately normalized) which result from a single signal impinging on the antenna array. The steering vector is a function of the direction-of-arrival of the signal. The term array covariance refers to the covariance matrix formed from outer products of the antenna array outputs. The term array characterizing data refers to the set of data that characterizes the array's spatial environment, and includes the set of all steering vectors, the array covariance, and other data such as the ambient noise covariance matrix commonly used in spatial filtering.

DTDR—The Invention

Again, digital signals and digital modulation is assumed. The methods of this invention are also applicable to analog signals and analog modulation as well however.

The essential elements of the DTDR operation is as follows:

1. The source equipment (18) generates the high rate source stream (20) after suitable data compression.
2. This source data stream is input to splitter (34) where it is split into d substreams, each at a lower bitrate than the source stream.
3. The signal splitter outputs (52, 54, 56) are communicated one each to the d transmitting stations (62, 64, 66) by d links using any state-of-the-art point-to-point communication technique.
4. At each of the transmitting stations (62, 64, 66), the corresponding substream received from the studio is input to the transmission equipment (22, 24, 26) where it is processed in the channel encoder, modulator and the transmit front-end for broadcasting into the service area. All transmitters use the same assigned frequency channel, and can use the entire allocated bandwidth of this channel.
5. All d cochannel transmitted signals are received by each of the multiplicity of receiving stations within the service area. At a representative receiving station (60), an antenna array consisting of m subarrays or elements (72, 74, 76) receives the d impinging signals.
6. Each of the m subarray outputs (78, 80, 82) will contain a mixture of all the d impinging signals plus noise. The subarray outputs after suitable processing in the m-channel receiver front-end (84) are fed to the spatial filter (88).
7. The spatial filter (88) consists of d processing channels, each of which selectively passes one of the transmitted signals while suppressing the d−1 signals arriving from the other transmitters as well as any external interferences.

Several alternative methods are known in state-of-the-art for such spatial filtering where they are referred to as adaptive hulling, optimum beamforming, etc. These methods address the problem of selectively passing signals arriving from known directions or with predefined characteristics while suppressing other signals impinging on the array.

In order for the spatial filter to selectively suppress signals, knowledge of spatial information such as the array covariance matrix, the steering vectors (one each for the d impinging signals), etc., is used. The internal parameters such as the weights of the spatial filter that determine its spatial selectivity can be preset or continuously tracked using techniques well known in the current state-of-the-art. In the preset mode, the array characterizing data is measured during antenna installation and parameters calculated and stored permanently. In the tracking mode, the array characterizing data is directly (or indirectly) updated during signal reception, and the spatial filter parameters updated continuously to provide a more robust interference cancellation performance.

8. The measurement put of array characterizing data can be accomplished by several means well known in state-of-the-art including using special signal transmission formats.

In one embodiment of the present invention, a special signal is transmitted at regular intervals (e.g., during fly back periods in HDTV). During this period, only one transmitter radiates power while all others transmitters turn off momentarily. During this brief interval when only the i-th transmitter is on, the signal at the outputs of the subarrays can be used to estimate the i-th steering vector. These methods are well established in the state-of-the-art. In another embodiment, different, but known, signals are transmitted simultaneously from each tower, and the received signals processed using knowledged of the transmitted waveforms to produced the steering vectors as is known in the current state-of-the-art.

9. The d spatial filter outputs (90) each contain a particular impinging signal from the corresponding transmitter. These d signals (90) are input to the d-channel demodulator/decoder (92) where they are demodulated and decoded to yield d bitstreams that correspond to the original substreams at the output of the splitter.
10. The d alemodulator/decoder outputs (96) are fed to the combiner (98) where they are first time-aligned to compensate for differential delays experienced by the signals (in moving from the studio to the transmitting station and then to the receiving station). The time-aligned d substreams are combined to obtain the estimated source stream. The combiner essentially reverses the operation of the signal splitter. In one embodiment, the combiner is a d-way multiplexer.
11. The combiner output bitstream (100) is an estimate of the original source signal and is fed to the terminal equipment (102) for generating output video, audio or data.

SUMMARY AND SCOPE OF THE INVENTION

Thus, it is clear to see that the present invention is a method and apparatus for increasing the capacity of a wireless broadcast system. The invention essentially consists of splitting a source signal, whose frequency content may exceed the allocated channel bandwidth, into signal components, and transmitting the components, each of whose frequency content is no greater than the allocated channel bandwidth, from spatially separated transmitters, all radiating into the broadcast area in the same frequency channel. The signals received from a plurality of antennas are processed to enable separation of the signals arriving in the same frequency channel into their separately transmitted components. These spatially demultiplexed components are then combined so as to reconstruct the original source signal. Thus, the broadcast information capacity can be increased several fold without increasing the allocated channel bandwidth, a property which is an unexpected result of the present invention. This increase effective transmission bandwidth or channel capacity can be used in part or whole to:

1. broadcast high definition/high fidelity signals,
2. reduce transmitted power and hence reduce interference into other channels within the same or neighboring service areas, and obtain all other benefits of reduced transmitted power, 3. transmit additional program channels in the same frequency channel where each channel is transmitted from one or more transmitters,
4. improve received signal quality through appropriate modulation and channel coding.

While the above description contains certain specificities, these should not be construed as limitations on the scope of the invention, but rather as an exemplification of one preferred embodiment and application thereof. Many other variations are possible. For example, the system can be:
1. used to increase the capacity of satellite broadcast service by using satellite-based instead of terrestrial transmitting stations,
2. implemented with mobile receiving stations rather than fixed receiving stations and from mobile transmitting stations rather than fixed transmitting stations,
3. used to increase the communication capacity from a set of transmitting stations to a single receiving station such as in mobile radio telephony and cellular telephony,
4. used for AM radio, FM radio, digital audio broadcasting (DAB), as well as data and other broadcast services.

Accordingly, the scope of the invention should not be determined by the embodiments illustrated, but by the appended claims and their legal equivalents.

What is claimed is:

1. A wireless broadcast system for transmission of a source signal from a plurality of spatially separated transmitters on a common frequency channel to at least one receiver located in a service area, said system comprising in combination demultiplexing means for splitting said source signal into a plurality of transmitted signals, one for each of said transmitters, conveying means for sending said transmitted signals one each to said transmitters, transmitting means including said transmitters for broadcasting said transmitted signals into said service area in said frequency channel so as to reach said receiver, receiving means including said receiver and plural receiving antennas for making measurements of signals received by said receiver, said received signals resulting from signals transmitted by said transmitters, said measurements being composed of different combinations of said transmitted signals, processing means for obtaining estimates of said transmitted signals from said measurements, reducing interference to acceptable levels, multiplexing means for combining said estimates of said transmitted signals so as to estimate said source signal, reducing interference to acceptable levels, whereby the information carrying capacity of the wireless broadcast system is increased.

2. A wireless broadcast system for transmission of a plurality of source signals from a plurality of spatially separated transmitters on a common frequency channel to at least one receiver located in a service area, said system comprising in combination combining means for joining said source signals into a composite source signal, demultiplexing means for splitting said composite source signal into a plurality of transmitted signals, one for each of said transmitters, conveying means for sending said transmitted signals one each to said transmitters, transmitting means including said transmitters for broadcasting said transmitted signals into said service area in said frequency channel so as to reach said receiver, receiving means including said receiver and plural receiving antennas for making measurements of signals received by said receiver, said received signals resulting from signals transmitted by said transmitters, said measurements being composed of different combinations of said transmitted signals, processing means for obtaining estimates of said transmitted signals from said measurements, reducing interference to acceptable levels, multiplexing means for combining said estimates of said transmitted signals so as to estimate said composite source signal, reducing interference to acceptable levels, separating means for decomposing said estimated composite source signal into said source signals, whereby a plurality of independent source signals can be transmitted in the same frequency channel.

3. Apparatus for transmitting an information signal and for receiving said information signal in a frequency channel having a bandwidth less than the bandwidth of said information signal, said apparatus comprising:

means for splitting said information signal into a plurality of information sub-signals, each sub-signal having a bandwidth no greater than said bandwidth of said frequency channel, transmitting means for transmitting in said frequency channel each of said sub-signals to a receiver, said transmitting means including a plurality of physically dispersed transmitters each transmitting one of said sub-signals, receiving means for receiving and processing said information sub-signals wherein said information sub-signals are retrieved, and means for combining said information sub-signals to reconstruct said information signal.

4. A method of transmitting an information signal to a receiver in a frequency channel having a bandwidth less than the bandwidth of said information signal and receiving said information signal at said receiver, said method comprising the steps of:

splitting said information signal into a plurality of information sub-signals, each sub-signal having a bandwidth no greater than said bandwidth of said frequency channel, transmitting in said frequency channel each of said information sub-signals to said receiver from a plurality of dispersed transmitters with each transmitter transmitting one of said information sub-signals, receiving and processing said information sub-signals with receiving means wherein said information sub-signals are retrieved, and combining said information sub-signals to reconstruct said information signal.

* * * * *